United States Patent [19]

Müller

[11] Patent Number: 5,106,198
[45] Date of Patent: Apr. 21, 1992

[54] APPARATUS FOR TREATING MOLTEN MATERIAL

[75] Inventor: Werner Müller, Hanover, Fed. Rep. of Germany

[73] Assignee: Hermann Berstorff Maschinenbau GmbH, Hanover, Fed. Rep. of Germany

[21] Appl. No.: 646,825

[22] Filed: Jan. 23, 1991

[30] Foreign Application Priority Data

Jan. 24, 1990 [DE] Fed. Rep. of Germany ....... 4001988

[51] Int. Cl.⁵ .............................................. B29C 47/42
[52] U.S. Cl. ................................... 366/75; 264/211.23; 366/83; 425/203; 425/204
[58] Field of Search ...................... 264/211.21, 211.23, 264/102, 349; 425/203, 204; 366/75, 76, 77, 79, 80, 83, 84, 85, 86, 89, 134

[56] References Cited

U.S. PATENT DOCUMENTS

| | | | |
|---|---|---|---|
| 2,754,542 | 7/1956 | Henning et al. | 366/85 |
| 2,763,046 | 9/1956 | Ludowici | 264/102 |
| 2,774,105 | 12/1956 | Bernhardt | 264/102 |
| 2,817,876 | 12/1957 | Gandelli et al. | 264/102 |
| 3,110,060 | 11/1963 | Rengert | 425/203 |
| 3,310,837 | 3/1967 | Wittrock | 366/85 |
| 3,470,584 | 10/1969 | Iwata et al. | 425/203 |
| 3,797,550 | 3/1974 | Latinen | 425/203 |
| 3,825,236 | 7/1974 | Hussmann et al. | 366/76 |
| 3,929,322 | 12/1975 | Hanslik | 366/85 |
| 4,176,967 | 12/1979 | Brinkmann et al. | 366/83 |
| 4,192,617 | 3/1980 | Spielhoff | 366/83 |
| 4,289,409 | 9/1981 | Brand | 366/83 |
| 4,303,344 | 12/1981 | Müller | 366/76 |
| 4,889,430 | 12/1989 | Mueller | 425/204 |

FOREIGN PATENT DOCUMENTS

| | | |
|---|---|---|
| 0208139 | 6/1986 | European Pat. Off. . |
| 2950717 | 8/1980 | Fed. Rep. of Germany . |
| 3030541 | 9/1988 | Fed. Rep. of Germany . |

Primary Examiner—Jay H. Woo
Assistant Examiner—W. J. Matney, Jr.
Attorney, Agent, or Firm—Foley & Lardner

[57] ABSTRACT

An apparatus for treating molten material wherein a gas is present during such treatment either by being removed from the molten material or by being added thereto. The apparatus comprises a housing having a continuous spindle or a pair of spindles disposed therein. The continuous spindle is externally threaded at least in its end regions, and the pair of spindles is externally threaded. A plurality of planet spindles are disposed circumferentially around the spindle are spindles. The planet spindles are also threaded and intermesh with one another as well as with the spindle or spindles. Furthermore, the internal wall of the housing is threaded and intermeshes with the threaded planet spindles. A treatment chamber is defined within the housing and the planet spindles define a wall surface of such chamber. The intermeshing components produce thin layers of the molten material which is carried, by the planet spindles, into the treatment chamber. Since the material is in this form, gas can readily be removed therefrom by connecting the chamber to a vacuum source or added thereto by connecting the chamber to a gas source.

10 Claims, 5 Drawing Sheets

APPARATUS FOR TREATING MOLTEN MATERIAL

FIELD OF THE INVENTION

The present invention relates to an apparatus for treating molten material. More particularly, the present invention relates to an apparatus which is capable of supplying gas to or removing gas from a molten material such as a thermoplastic plastics material, a high-molecular weight polymer or other fluid materials.

BACKGROUND OF THE INVENTION AND PRIOR ART DISCUSSION

A degassing apparatus which has a housing of substantially circular cross-section provided with inlet and outlet apertures for the material to be treated is known.

U.S. Pat. No. 3,470,584 discloses such an apparatus. Such apparatus includes a degassing arrangement which is disposed between two extrusion devices mounted in tandem with respect to one another. The material to be degassed is conveyed, by the first extrusion device, into a chamber formed in the degassing arrangement through the intermediary of a spring-loaded cone or tapered sleeve. This causes the material to enter such chamber in the form of thin layers of material. The interior of the chamber is subjected to a vacuum or to a reduced pressure. The vacuum causes residual monomers and similar volatile substances contained in the molten mass to be removed from the thin layers. The molten mass is then supplied to the second extrusion device and further processed. The degassing effect produced by such an apparatus is, however, minimal, because the creation of the thin film of molten material only during its extrusion into the vacuum chamber limits the amount of gas which can be removed.

In German Patent Specification No. 30 30 541, there is disclosed a multi-shaft kneading disc reactor for the continuous production of degassed polymers. Conveying shafts are disposed in a circular manner around the periphery of a degassing chamber. Each conveying shaft meshes with the conveying shafts disposed adjacent thereto. The intermeshing conveying shafts effectively form the outer periphery of the degassing chamber with the result that a film of molten material is formed on such periphery. Since a vacuum prevails in the degassing chamber, these layers of molten material are degassed.

Such an arrangement therefore provides a degassing chamber having a large surface area and thus produces good degassing results. However, such an arrangement suffers from the disadvantages of the difficulty in sealing the degassing chamber and the difficulty of driving the individual, intermeshing conveyor shafts. Thus, for example, it is necessary to provide a plurality of individual shaft seals, one such seal being required for each conveying shaft. The shafts, which rotate about their own axis but are otherwise static, are disposed in a housing. Such an assembly is described in detail in European Patent Specification No. 0 208 139A.

OBJECTS OF THE INVENTION

The present invention seeks to provide an apparatus for treating molten material which can be selectively used to gas or degas the material, which apparatus is generally of the above-described type in that the treatment chamber has a large surface area but in which the above-mentioned disadvantages of sealing and driving are obviated or at least minimised. The present invention also seeks to provide an apparatus which is simple to manufacture and is reliable in operation.

SUMMARY OF THE INVENTION

According to a first aspect of the present invention, there is provided an apparatus for treating molten fluid materials wherein gaseous materials are present during such treatment, said apparatus comprising a housing; said housing comprising a longitudinal axis and a wall surface disposed around said longitudinal axis but spaced therefrom, said wall surface carrying toothing means, said housing further including opposed first and second axial end regions each having a substantially circular internal cross-section; upper spindle means disposed in said first end region and lower spindle means disposed in said second end region, both said spindle means being co-axial with said longitudinal axis of said housing, each said spindle means including an external surface and toothing formed on said external surface; shaft means interconnecting said upper and said lower spindle means, said shaft means having a reduced diameter compared with said spindle means; a plurality of planet spindle means disposed within said housing, each said planet spindle means including a longitudinal axis extending parallel to said longitudinal axis of said housing and an external surface, said external surface of each said planet spindle carrying a toothing, said toothing simultaneously meshing with said toothing carried by said upper and said lower spindle portions and with said toothing carried by said wall surface of said housing, said planet spindles being equiangularly spaced apart from one another around said longitudinal axis of said housing; said planet spindles and said upper and lower spindle portions jointly defining the external periphery of a treatment chamber and said connecting shaft defining the internal periphery of said treatment chamber; said shaft being formed with an internal, longitudinally extending bore, and a plurality of transversely extending bores, said transversely extending bores communicating said treatment chamber with said longitudinal bore; gas duct means communicating with said longitudinal bore for selectively removing gas from said treatment chamber through said bores and for supplying gas to said treatment chamber through said bores; drive means operatively connected to said upper spindle means for rotating said spindle, molten material inlet means communicating with said interior of said housing, and molten material discharge means operatively connected to said lower spindle means.

According to a second aspect of the present invention, there is provided an apparatus for treating molten fluid materials wherein gaseous materials are present during such treatment, said apparatus comprising a housing; said housing comprising a longitudinal axis and a wall surface disposed around said longitudinal axis but spaced therefrom, said housing having a substantially circular internal cross section, said housing further including opposed first and second axial end regions and a central portion intermediate said first and second axial end regions wherein said internal cross-section in said central portion is greater than said internal cross-section in said first and second end regions, said wall surface carrying toothing means in said first and second end regions; longitudinal spindle means disposed in said housing extending from said first end region to said second end region, said spindle means including a longitudinal axis coaxial with said longitudinal axis of said housing and an external surface, toothing formed on said external surface; a plurality of planet spindle means disposed within said housing and extending from said first end region to said second region, each said planet spindle means including a longitudinal axis extending parallel to said longitudinal axis of said housing and an external surface toothing formed on said external surface of each said planet spindle means, said planet spindle means toothing meshing simultaneously with said longitudinally spindle means toothing over its entire length and with said wall surface toothing means, said planet spindle means being equiangularly spaced apart from one another around said longitudinal axis of said housing; said plurality of planet spindle means, said opposed first and second end regions of said housing and said central portion of said housing jointly defining the internal periphery of a treatment chamber; gas duct means communicating with said treatment chamber for selectively removing gas from said treatment chamber and for supplying gas to said treatment chamber; drive means operatively connected to said longitudinal spindle means for rotating said spindle; molten material inlet means communicating with said interior of said housing in said first end region; and molten material discharge means operatively connected to said second end region of said housing. Although the description of the preferred embodiments hereafter primarily discusses the use of the apparatus to degas a molten material, the supply of a gas into the molten masses is also possible.

In the first aspect, upper and lower spindle portions, each of which has an inclined toothing on its external surface to convey the material are interconnected by a shaft of smaller diameter than the portions and defined therewith a treatment chamber.

The longitudinal shaft is provided with an axial bore, which communicates either with an arrangement for generating a vacuum or with a gas source. Furthermore, the axial bore in the shaft communicates with the chamber through the intermediary of transverse bores, with the result that either a vacuum may be produced in the chamber or gas may be caused to enter the chamber.

Planet spindles are equiangularly disposed in the housing around the upper and lower central spindle portions and extend over the entire length of the shaft. The planet spindles mesh with a conveying toothing formed on the internal surface of the housing. The uniform spacing between adjacent planet spindles causes small chambers to be defined which communicate with the degassing chamber.

The planet spindles are rotated about their own axes as a result of the spindle portions being rotated but simultaneously execute a circulatory movement around the spindles due to the meshing thereof with the toothing on the housing.

Due to such movement of the planet spindles, which have a toothing over their entire length, the molten mass fed into the housing under pressure is rolled-out into very thin layers, from which volatile ingredients can easily be removed or to which gas can readily be added.

The sealing of the chamber is achieved, in the teed section, by feeding the molten material under pressure, and in the outlet region, by means of a discharge screw which communicates with the lower spindle portion. The discharge screw builds-up a tool pressure, for example, for a further treatment device such as a granulator. This pressure also seals the chamber.

An apparatus in accordance with the present invention has a substantial number of advantages over prior art apparatus.

These are:

a very large volume chamber the formation of very thin layers of material by the planet spindles on the internal wall of the housing, or in the nip region between the toothed spindle and the toothed housing wall;

a large surface area of the thin layers of molten mass is created in a chamber, in which, in one aspect, a high vacuum may be built-up, without the risk of the vacuum conduits and pumps being adversely effected;

in one aspect, depending on the axial length or, in the second aspect, the diameter of the housing and of the central spindle, as well as the number of planet spindles, a degassing chamber of any desired dimensions may be created. This means that the throughput of the molten material is controllable, as desired, without any disadvantageous effect on the degassing operation;

far better degassing results are achieved than has hitherto been possible;

for the first time, even highly viscous molten masses can be degassed efficiently because all of the molten material passes continuously into and out to the nip region between the planet spindles and the internal wall of the housing and is rolled-out on a plurality of occasions to form thin layers. Since the toothing on planet spindles and on the internal wall of the housing have a conveying effect, even a highly viscous molten material can now be satisfactorily degassed.

BRIEF DESCRIPTION OF THE DRAWINGS

Two embodiments of an apparatus in accordance with the present invention will be further described, by way of example, with reference to the accompanying drawings, in which.

DETAILED DESCRIPTION OF THE PREFERRED EMBODIMENTS

Figure 1:
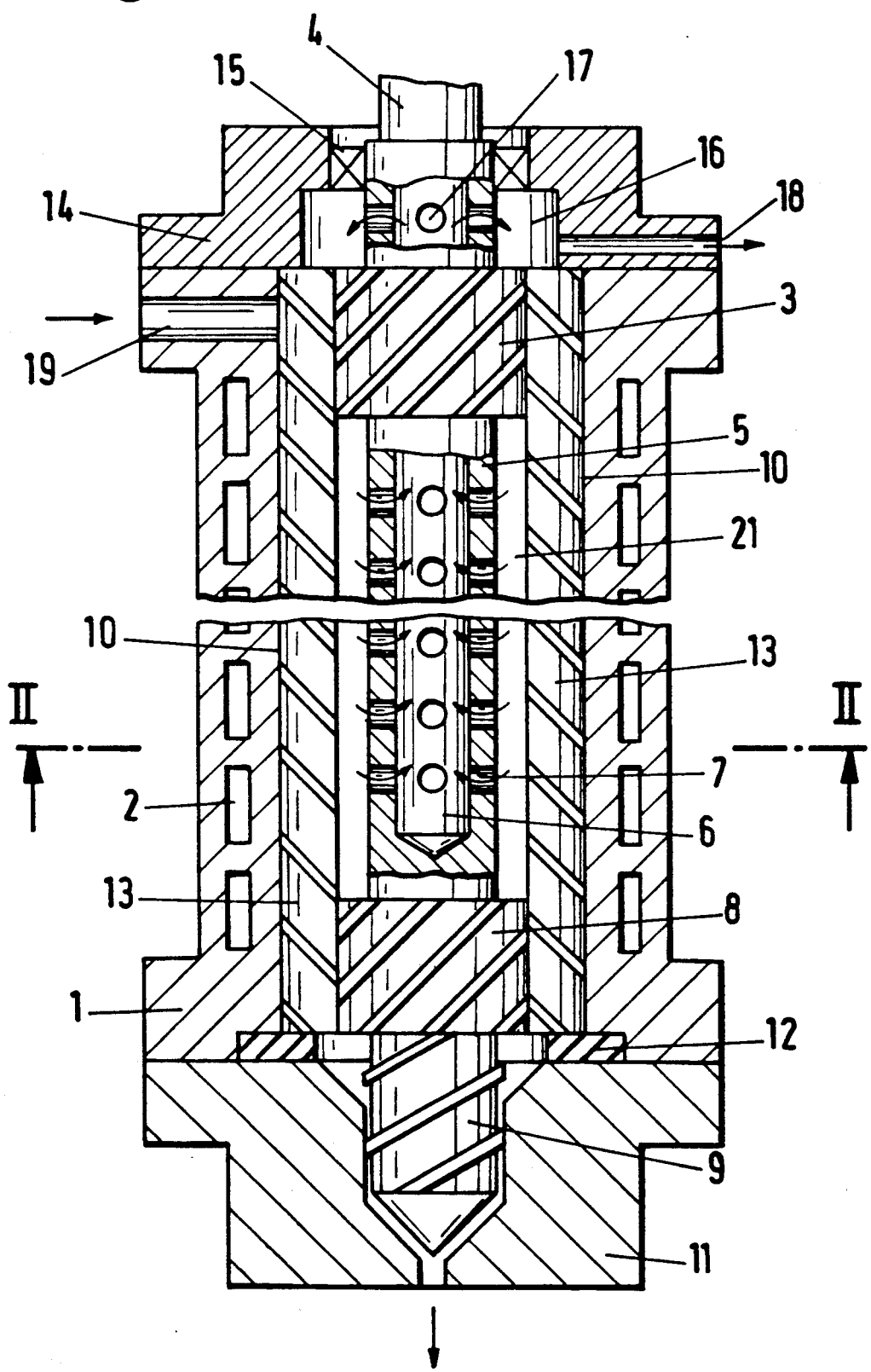
FIG. 1 is a longitudinal sectional view through a first embodiment of an apparatus in accordance with present invention comprising drive means, a plurality of planet spindles driven by the drive means and a treatment chamber disposed inwardly of the planet spindles.

In FIG. 1, there is shown a first embodiment or an apparatus in accordance with the present invention. The apparatus comprises a vertically extending housing 1 having apertures 2 formed in the surface thereof for the passage of a temperature-control medium therethrough for maintaining the housing at a desired temperature. The housing 1 has a substantially circular internal cross-section. Within the housing 1, at the upper and lower ends thereof respectively, spindle members and 8 are provided. The spindle members 3 and 8 are coaxial with the medial longitudinal axis of the housing 1.

The spindle member 3 is connected, externally or the housing, to a drive shaft 4. At its lower end, within the housing 1, the spindle 3 carries shaft 5. This shaft 5 has a reduced diameter compared with the spindles 3 and 8 and has an axially-extending longitudinal bore 6 and a plurality of transverse bores 7 formed therein. The transverse bores communicate with the longitudinal bore 6. A treatment chamber 21 is thus formed between the shaft 5 and the spindles 13. Such chamber is more clearly seen in FIG. 2.

The shaft 5 connects the upper spindle portion 3 to the lower spindle portion 8 in a non-rotatable manner. A discharge screw extrusion portion 9 is non-rotatably mounted on the shaft 5 and forms an axial extension of the shaft 5 and of the spindles 3 and 8.

A plurality of longitudinally extending planet spindles 13 are disposed circumferentially around the spindle portions 3 and 8. The inter-center spacing of the adjacent spindles 13 is substantially identical Each spindle 13 is provided with teeth or flights on its external periphery which mesh with correspondingly inclined teeth or flights provided on the external periphery of the spindle portions 3 and 8. The internal wall 10 of the housing 1 is likewise provided with inclined teeth or flights 10a (FIG. 2), which cooperates with the teeth or flights formed on the planet spindles 13.

The housing 1 is sealed at its lower end by means of a flanged end-piece 11. The end-piece carries an abutment ring 12 for the lower ends of the planet spindles 13. At its upper end, the housing 1 is sealed by a flanged end-piece 14. The end-piece 14 carries a bearing 15 in which the drive shaft 4 rotates.

An annular conduit 16 is formed in the upper end-piece 14, which conduit is disposed around the drive shaft 4. The conduit 16 communicates with the longitudinal bore 6 formed in the shaft 5 through the intermediary of one or more bores 17. An arrangement (not shown) which, as desired, either produces a vacuum or provides a supply of gas, communicates with the annular conduit through the intermediary of the conduits 18 formed in the flanged end-piece 14.

Figure 2:
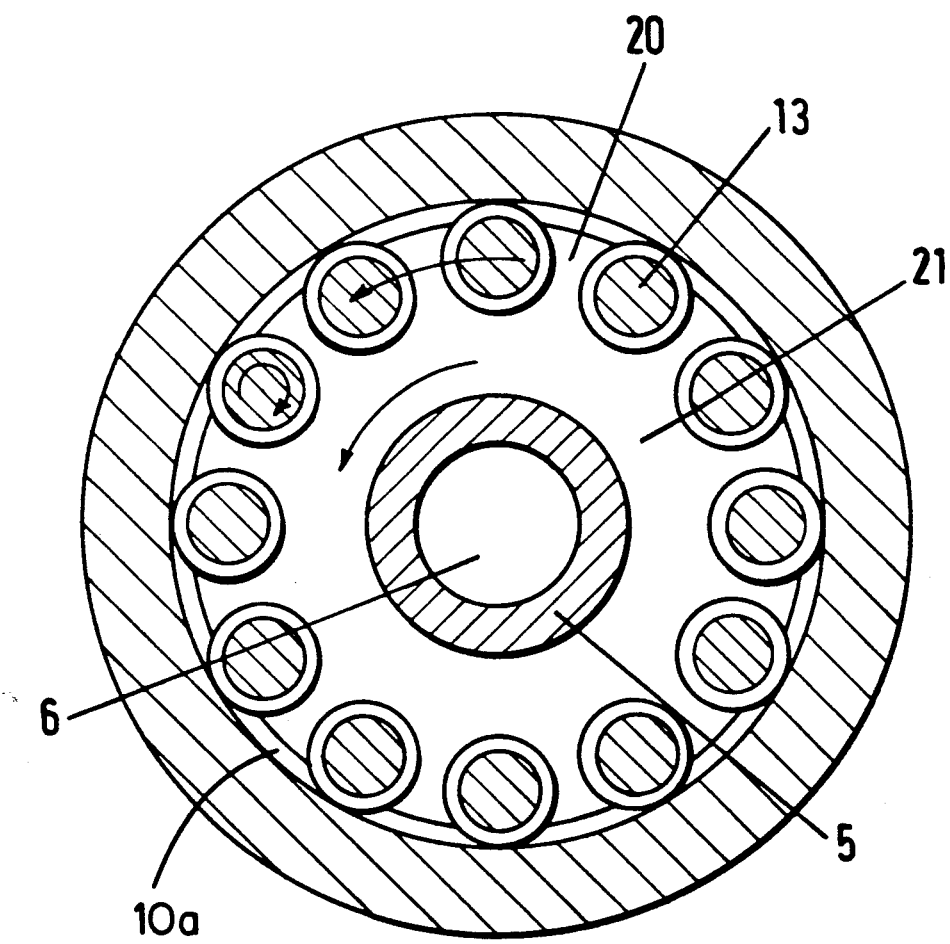
FIG. 2 is a cross-sectional view taken along the line II—II of FIG. 1.

Extending through the wall or the housing 1 is a throughbore 19. This acts as a reed conduit for the molten material The molten mass, which is tend under pressure and passes through the bore 19 into the cavities 20 (as shown in FIG. 2) formed between the planet spindles 13.

The meshing of the planet spindles 13 with the teeth 10 formed on the housing 1 and with the teeth on the spindle 3 causes the production of the molten material which are conveyed on the planet spindles. For the sake of simplicity, it will be assumed that this molten mass is to be degassed and, accordingly, the duct 18 is connected to a vacuum source. After passing between these teeth the material enters the chamber 21 which acts in this case, as a degassing chamber. Since the material is now in the form of thin layers, the vacuum prevailing in the chamber readily removes gaseous matter from the material. Such gas is discharged from the chamber 21 through the transverse bores 7, the longitudinal bore 6, the bore 17 and the annual conduit 16 formed in flanged end-piece 14.

The molten mass, which has been degassed on the planet spindle surfaces, is conveyed by the planet spindles 13 to the discharge screw 9, in which a tool pressure is built-up for any desired subsequent treatment.

Figure 4:
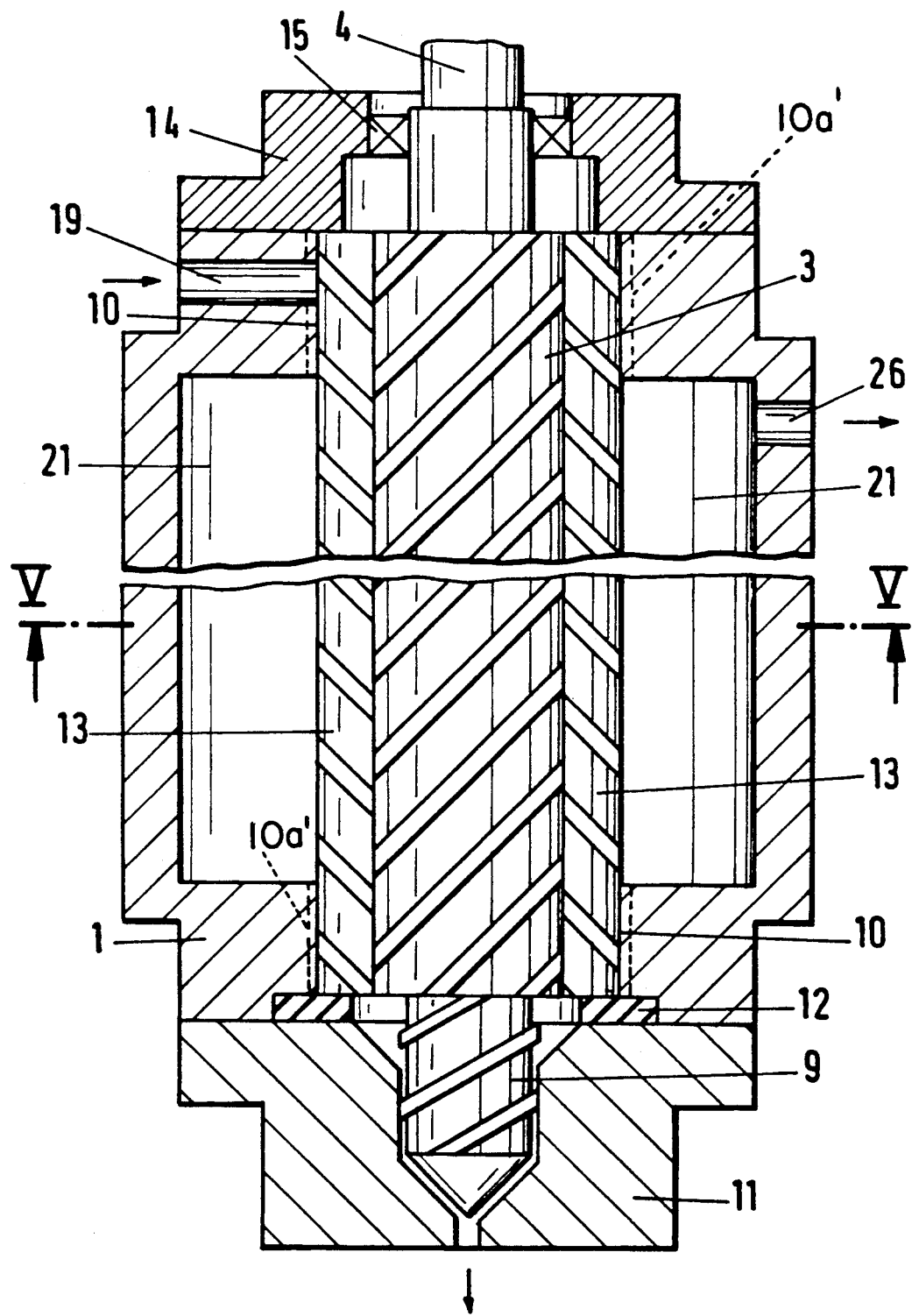
FIG. 4 is a longitudinal sectional view through a second embodiment of an apparatus in accordance with the present invention comprising drive means, a plurality of planet spindles driven by the drive means and a treatment chamber disposed within a housing for the apparatus but outwardly of the planet spindles.

FIG. 4 illustrates a second embodiment of an apparatus in accordance with the present invention. In this embodiment, like reference numerals generally denote like parts to those appearing in the embodiment described with reference to FIG. 1. In FIG. 4, a vertically disposed housing 1 is again provided. However, the spindle members 3 and 8 and the shaft 5 are replaced by a continuous spindle 3.

The central spindle 3 is provided with an inclined toothing over the entire length of its external surface and the inclined toothing of each of the planet spindles 13 mesh therewith Such meshing causes the planet spindles 13 to execute a circulator path around the central spindle 3. The planet spindles 13 are disposed at regular intervals from one another around the central spindle 3.

In its upper and/or lower regions, the internal wall 10 of the housing 1 is likewise provided with an inclined toothing 10a', which toothing co-operates with the toothing provided on the planet spindles 13. In its central region, between the internally toothed portions 10, the housing is recessed such that a treatment chamber 21 is defined inwardly of the recessed wall of the housing and outwardly or the planet spindles 13.

The housing I is sealed at its lower end by means of a flange-mounted end-piece 11, on which an abutment ring 12 for the planet spindles 13 is disposed. At its upper end, housing 1 is sealed by an upper end-piece 14, in which a bearing 15 is provided. The drive shaft 4 rotates in this bearing 15.

Figure 5:
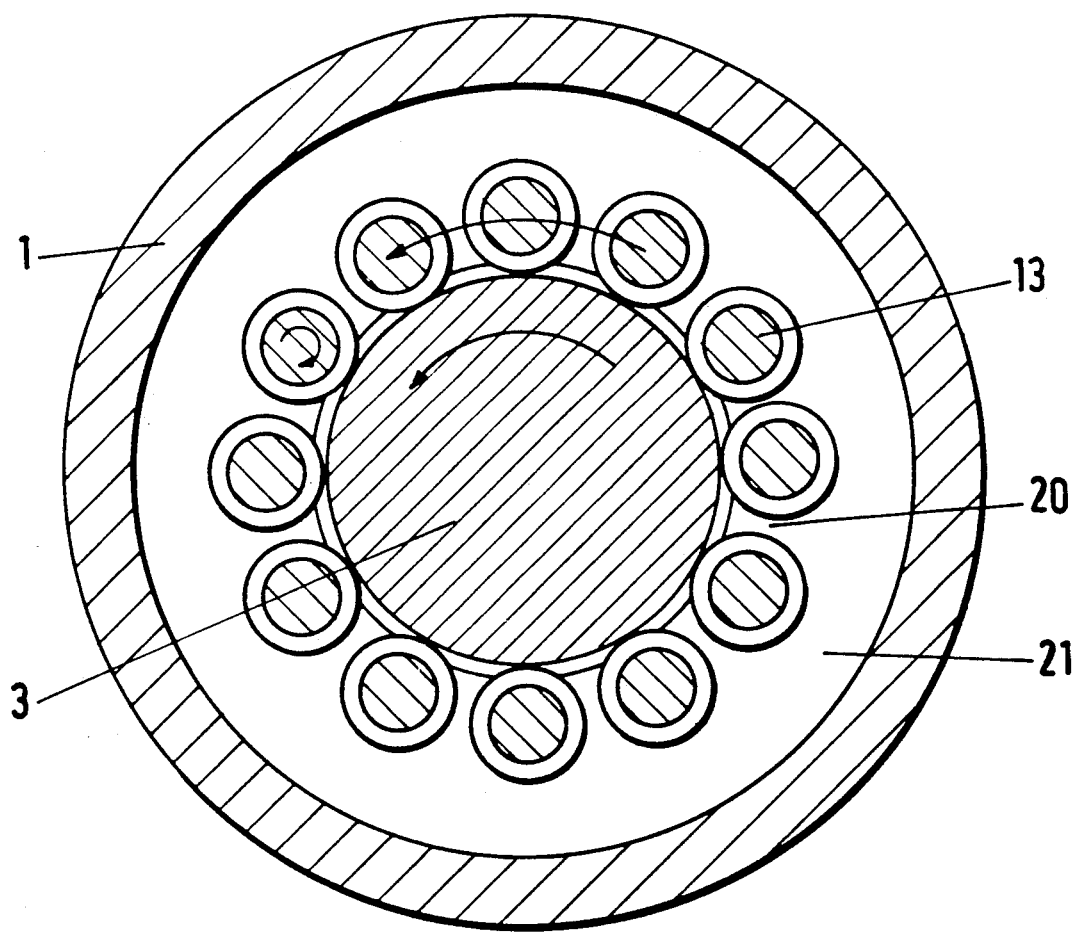
FIG. 5 is a cross-sectional view taken along the line V—V of FIG. 4.

The molten material, under pressure, is introduced into the housing 1 through a teed conduit 19 which passes through the wall of the housing. The material then passes into the cavities 20, shown in FIG. 5, defined between adjacent planet spindles 13.

The toothing on the external surface of the planet spindles 13 meshes with the internal toothing 10 formed on the housing 1 and along the inclined toothing formed on the central spindle 3. In consequence, thin layers of the molten material are produced on the toothed surface of the planet spindles 13. Assuming again that gas is to be removed from the material, a vacuum pump 24 (FIG. 3) is provided which, through the intermediary of a further bore 26 communicates with the degassing chamber 21. As a result of the vacuum, volatile components present in the thin layers are readily removed. The degassed molten material is conveyed, on the toothing of the planet spindles 13 to a discharge screw 9, which removes the molten material from the apparatus.

Figure 3:
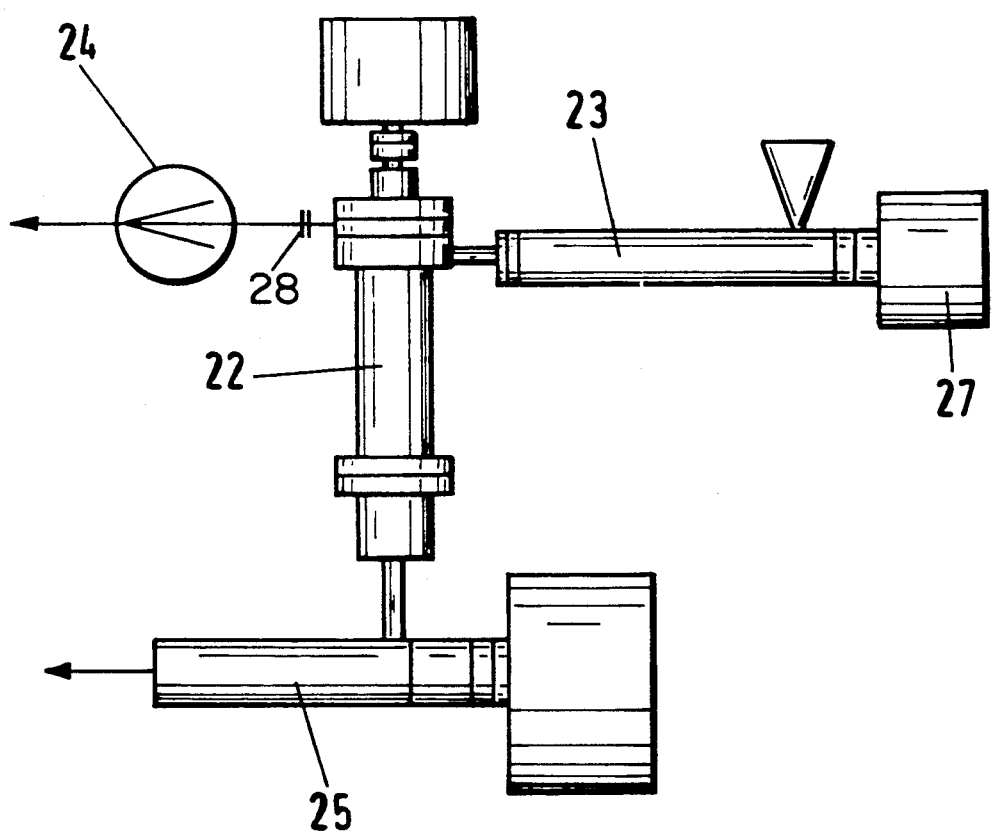
FIG. 3 is a schematic view of an extrusion arrangement provided with an apparatus in accordance with the present invention.

FIG. 3 schematically illustrates the manner in which the treatment apparatus of the present invention can be incorporated into an extrusion apparatus. A thermoplastic plastics material to be treated is extruded, as a molten mass, in a first screw extrusion device 23, provided with a drive means 27. The molten plastics material is then fed into the treatment apparatus 22 according to the present invention. After degassing, the molten material is further conveyed to an additional apparatus 25 such as a further extrusion device or a granulator. The gas, which is removed from the molten material, is removed by suction utilising a vacuum pump 24 through the intermediary of a valve schematically shown at 28.

Although reference has been made hereinbefore to the degassing of materials, it will be readily apparent that the apparatus of the present invention could equally easily be used to introduce gas into a molten mixture. Thus, for example, such use may be utilised to cause a reaction to take place in the apparatus. Such gassing, as opposed to degassing can be achieved by simply replacing the vacuum source with a source of a desired gas.

I claim:

1. An apparatus for treating molten fluid materials wherein gaseous materials are present during such treatment, said apparatus comprising a housing; said housing comprising a longitudinal axis, a wall defining an internal wall surface disposed coaxial with said longitudinal axis but spaced therefrom, said wall surface carrying toothing, said housing further including opposed first and second axial end portions having a substantially circular internal cross-section; an upper spindle disposed in said first end portion, and a lower spindle disposed in said second end portion, both said spindles being co-axial with said longitudinal axis of said housing, each said spindle including an external surface and toothing formed on said external surface; a shaft interconnecting said upper and said lower spindles, said shaft having a reduced diameter compared with the diameter of said spindles, said shaft being formed with an internal longitudinally extending bore and a plurality of transversely extending bores; a plurality of planet spindles disposed within said housing, each said planet spindle including a longitudinal axis extending parallel to said longitudinal axis of said housing and an external surface carrying a toothing, said toothing simultaneously meshing with said toothing carried by said upper and said lower spindles and with said toothing carried by said wall surface of said housing, said planet spindles being substantially equiangularly spaced apart from one another around said longitudinal axis of said housing; said planet spindles and said upper and lower spindles jointly defining the external periphery of a treatment chamber, and said connecting shaft defining the internal periphery of said treatment chamber; said transversely extending bores formed in said shaft communicating said treatment chamber with said longitudinal bore; gas duct means communicating with said longitudinal bore for selectively removing gas to said treatment chamber through said bores and for supplying gas to said treatment chamber through said bores; drive means operatively connected to said upper spindle for rotating said upper spindle, molten material inlet means communicating with said interior of said housing for delivering material thereto, and molten material discharge means operatively connected to said lower spindle for discharging treated material from said housing.

2. An apparatus as recited in claim 1, further comprising vacuum source means communicating with said treatment chamber through said gas duct means.

3. An apparatus as recited in claim 1, wherein said shaft has an axial length corresponding from about 1 to about 10 times the diameter of said upper and lower spindles.

4. An apparatus as recited in claim 1, further including a flanged end-piece sealed to said first end portion of said housing, and wherein said drive means is disposed above and coaxial with said upper spindle, said drive means including a further shaft portion formed with at least one radial bore communicating with said longitudinal bore, and wherein said gas duct means comprises an annular conduit communicating with said radial bore, and a further conduit formed in said flanged end-piece.

5. An apparatus as recited in claim 1, wherein said housing is formed with a plurality of bores in said wall for the passage of a temperature-control medium therethrough.

6. An apparatus as recited in claim 1, wherein said material discharge means is disposed below said lower spindle and comprises a discharge screw.

7. An apparatus for treating molten fluid materials wherein gaseous materials are present during such treatment, said apparatus comprising a housing having a longitudinal axis and including opposed first and second axial end portions having internal wall surfaces, and a central portion intermediate said first and second axial end portions, said central portion being radially spaced from said longitudinal axis and having a circular internal cross-section and an external wall surface, the internal diameter of said central portion being greater than the internal diameter of said first and second end portions, said internal wall surface of said end portions carrying toothing, a longitudinal spindle disposed in said housing extending from said first end portion to said second end portion, said spindle carrying toothing on its exterior surface and including a longitudinal axis coaxial with said longitudinal axis of said housing; a plurality of planet spindles disposed within said housing and extending from said first end portion to said second end portion, each said planet spindle including a longitudinal axis extending parallel to said longitudinal axis of said housing, and an external surface on which toothing is formed, said planet spindle toothing meshing simultaneously with sad longitudinal spindle toothing over its entire length and with the toothing on said wall surface, said planet spindles being substantially equiangularly spaced apart from one another around said longitudinal axis of said housing; said plurality of planet spindles, said opposed first and second end portions of said housing and said central portion of said housing jointly defining a treatment chamber; gas duct means communicating with said treatment chamber for selectively removing gas from said treatment chamber and for supplying gas to said treatment chamber; drive means operatively connected to said longitudinal spindle for rotating said spindle, molten material inlet means in said first end portion of said housing for delivering molten metal to the interior of said housing, and molten material discharge means operatively connected to said second end portion of said housing for discharging treated material therefrom.

8. An apparatus as recited in claim 7, further including gas source means communicating with said treatment chamber through said gas duct means.

9. An apparatus as recited in claim 7, further including a flanged end-piece connected to and sealing said first axial end portion of said housing, and a bearing carried by said end-piece for rotatably mounting said drive means.

10. An apparatus as recited in claim 7, wherein said material discharge means is disposed below said second end region and said housing and comprises a discharge screw.

* * * * *